US008770901B2

(12) United States Patent
Tang et al.

(10) Patent No.: US 8,770,901 B2
(45) Date of Patent: Jul. 8, 2014

(54) SPINDLE CONTROL SYSTEM FOR A MILLING MACHINE

(75) Inventors: Chia-Hui Tang, Taichung (TW); Yu-Lin Juan, Taichung (TW); Jin-Jia Chen, Taichung (TW); Tsair-Rong Chen, Changhua County (TW); Paul Chang, Taichung (TW)

(73) Assignees: Buffalo Machinery Company Limited (TW); The Department of Electrical Engineering, National Chang-Hua University of Education (TW)

( * ) Notice: Subject to any disclaimer, the term of this patent is extended or adjusted under 35 U.S.C. 154(b) by 659 days.

(21) Appl. No.: 13/110,650

(22) Filed: May 18, 2011

(65) Prior Publication Data

US 2012/0294688 A1    Nov. 22, 2012

(51) Int. Cl.
*B23Q 15/18* (2006.01)

(52) U.S. Cl.
USPC ........... 409/187; 409/194; 409/208; 409/238; 408/6; 408/11

(58) Field of Classification Search
CPC .... B23Q 15/007; B23Q 15/013; B23Q 15/08; B23Q 15/18; B23Q 17/09; B23Q 17/0952; B23Q 17/0971; B23Q 17/0976; B23Q 17/0985; B23Q 17/12; B23Q 17/22; B23Q 17/2241; B23Q 17/24; B23Q 17/248; B23Q 2017/00; B23Q 2217/006

USPC ......... 409/186, 187, 193, 194, 207, 208, 210, 409/214, 238, 239; 408/6, 8, 9, 10, 11, 13
See application file for complete search history.

(56) References Cited

U.S. PATENT DOCUMENTS

| | | | | |
|---|---|---|---|---|
| 4,195,250 A | * | 3/1980 | Yamamoto | 318/561 |
| 5,470,081 A | * | 11/1995 | Sato et al. | 463/36 |
| 5,571,040 A | * | 11/1996 | Kawaguchi et al. | 451/11 |
| 5,623,857 A | * | 4/1997 | Sakuraba | 82/1.11 |
| 5,795,112 A | * | 8/1998 | Senda | 409/131 |
| 6,301,520 B1 | * | 10/2001 | Hayashi | 700/193 |

* cited by examiner

*Primary Examiner* — Daniel Howell
*Assistant Examiner* — Nicole N Ramos
(74) *Attorney, Agent, or Firm* — Banner & Witcoff, Ltd

(57) ABSTRACT

A spindle control system for a milling machine is provided. The milling machine includes a column, an overarm, a spindle for mounting a cutter, a first motor mounted on the column for driving movement of the overarm, and a second motor mounted on the overarm for driving rotation of the spindle. The spindle control system includes a distance sensor and a temperature sensor, each to be mounted on the overarm and to be disposed proximate to the end portion of the spindle. The spindle control system further includes a central control unit for determining a compensation parameter based on the displacement sensed by the distance sensor and the temperature sensed by the temperature sensor, and for controlling movement of the overarm by the first motor through a compensation distance based on the compensation parameter to compensate for at least one of the cutter deformation and the spindle deformation.

14 Claims, 4 Drawing Sheets

SPINDLE CONTROL SYSTEM FOR A MILLING MACHINE

BACKGROUND OF THE INVENTION

1. Field of the Invention

The invention relates to a spindle control system, and more particularly to a spindle control system for a milling machine.

2. Description of the Related Art

Referring to FIG. 1, a conventional vertical bed mill 1 includes a base 11 for supporting a work piece (A), a column 12 mounted on the base 11, an overarm 13 movable along a Z-axis direction on the column 12, and a spindle 14 extending rotatably through the overarm 13 and mounted with a cutter (B). The cutter (B) may be displaced relative to the work piece (A) along the Z-axis direction for cutting. The conventional vertical bed mill 1 may inaccurately determine a temperature of the system, and may consequently inadequately compensate for temperature related deformation during cutting operations and adversely affect manufacturing precision.

SUMMARY OF THE INVENTION

Therefore, an object of the present invention is to provide spindle compensation in a milling machine that can increase compensation accuracy to increase manufacturing precision of the milling machine.

Accordingly, an aspect of the present invention is a spindle control system for a milling machine. The milling machine includes a column, an overarm connected to and movable relative to the column, a spindle extending rotatably through the overarm and having an end portion exposed outside of the overarm for mounting a cutter, a first motor mounted on the column for driving movement of the overarm, and a second motor mounted on the overarm for driving rotation of the spindle.

The spindle control system includes a distance sensor to be mounted on the overarm and to be disposed proximate to the end portion of the spindle for sensing displacement along a first axis by the spindle as a basis for determining spindle deformation. The spindle control system further includes a temperature sensor to be mounted on the overarm and to be disposed proximate to the end portion of the spindle for sensing the temperature of the overarm as a basis for determining cutter deformation. The spindle control system also includes a central control unit coupled electrically to the distance sensor and the temperature sensor, and to be coupled electrically to the first motor and the second motor.

The central control unit is configured for determining a compensation parameter based on the displacement sensed by the distance sensor and the temperature sensed by the temperature sensor, and for controlling movement of the overarm by the first motor through a compensation distance based on the compensation parameter to compensate for at least one of the cutter deformation and the spindle deformation.

The spindle control system for a milling machine according to this invention may have the following advantages, among others:

1) because the distance sensor and the temperature sensor are mounted on the overarm proximate to the end portion of the spindle, the accuracy of the detected cutter temperature is improved along with compensation for deformation based on deformation of the cutter; and 2) because the spindle control system of this invention uses at least one of sensed displacement and sensed temperature to determine deformation, displacement compensation and manufacturing precision are improved.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
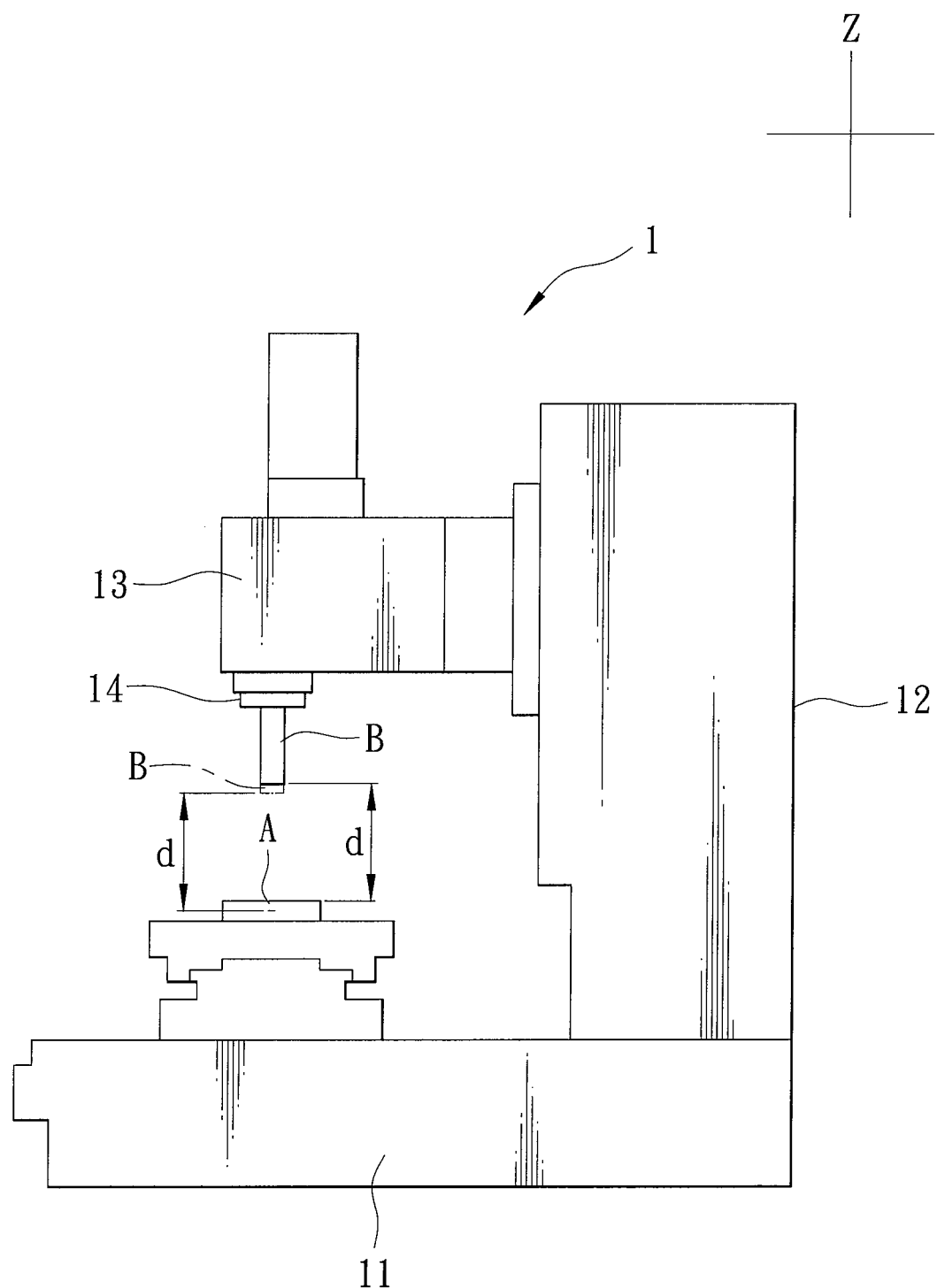
FIG. 1 is a schematic side view of a conventional milling machine.
Figure 2:
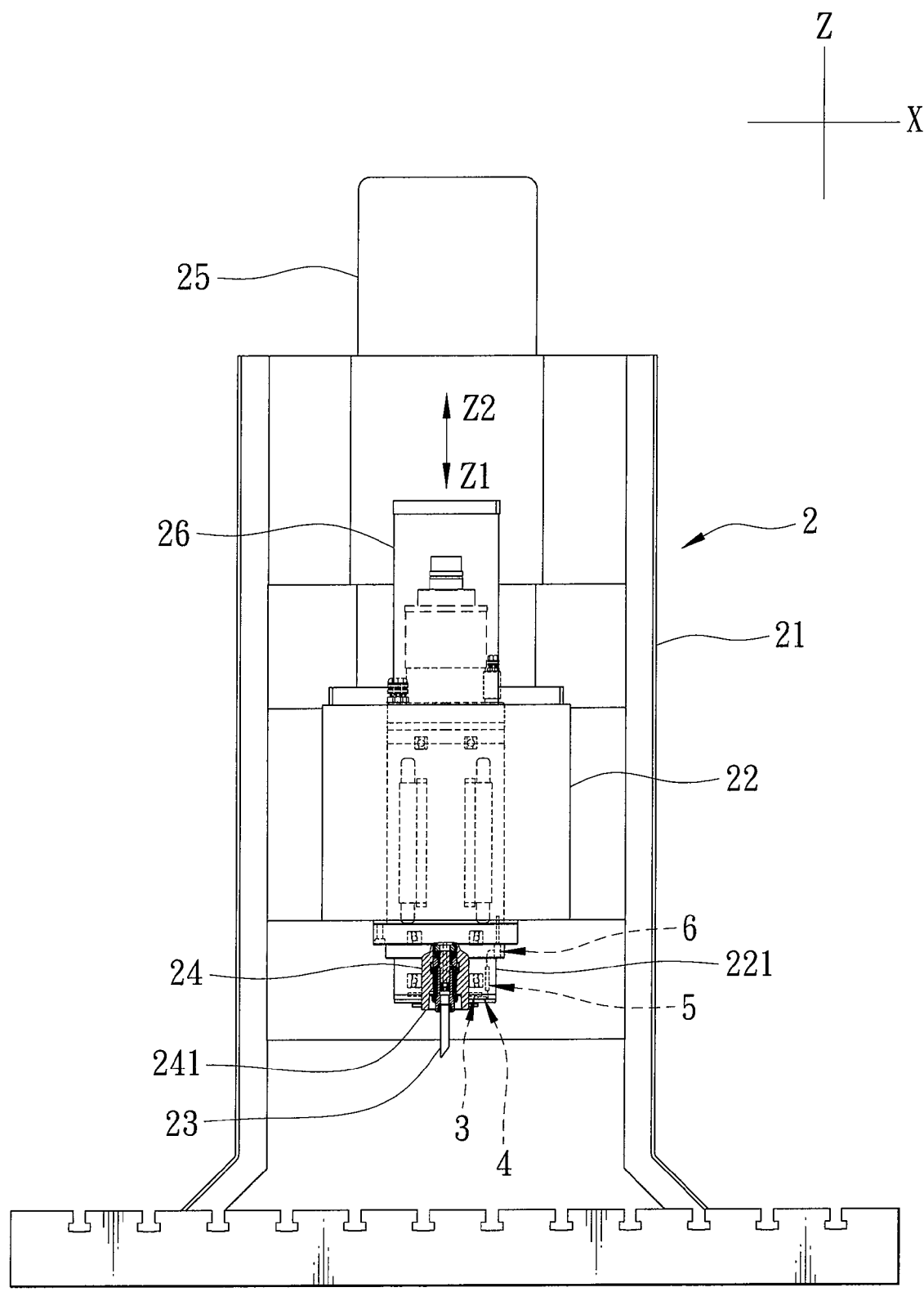
FIG. 2 is a schematic view illustrating a spindle control system mounted on a milling machine according to a preferred embodiment of the present invention.
Figure 3:
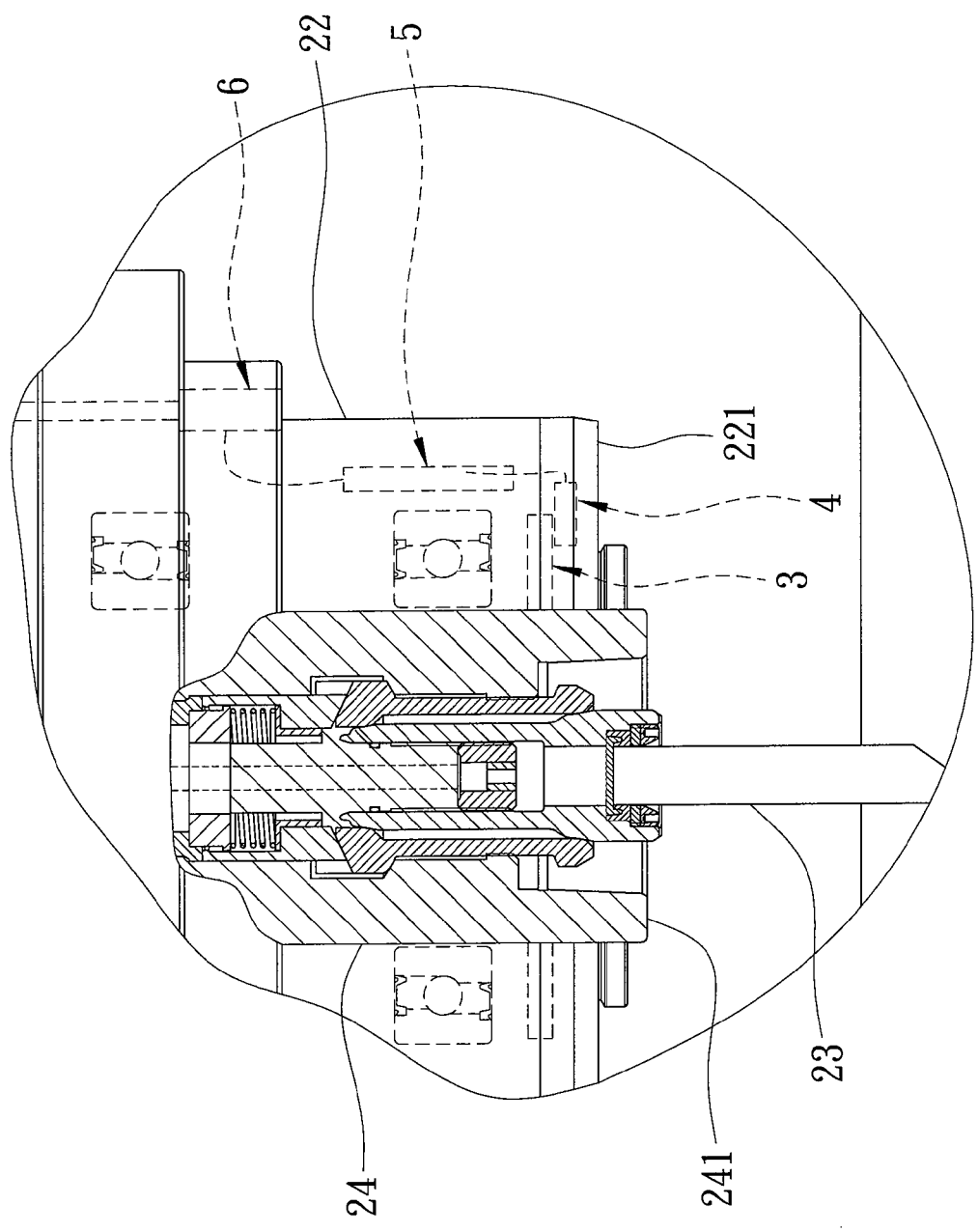
FIG. 3 is an enlarged fragmentary sectional view of the preferred embodiment.
Figure 4:
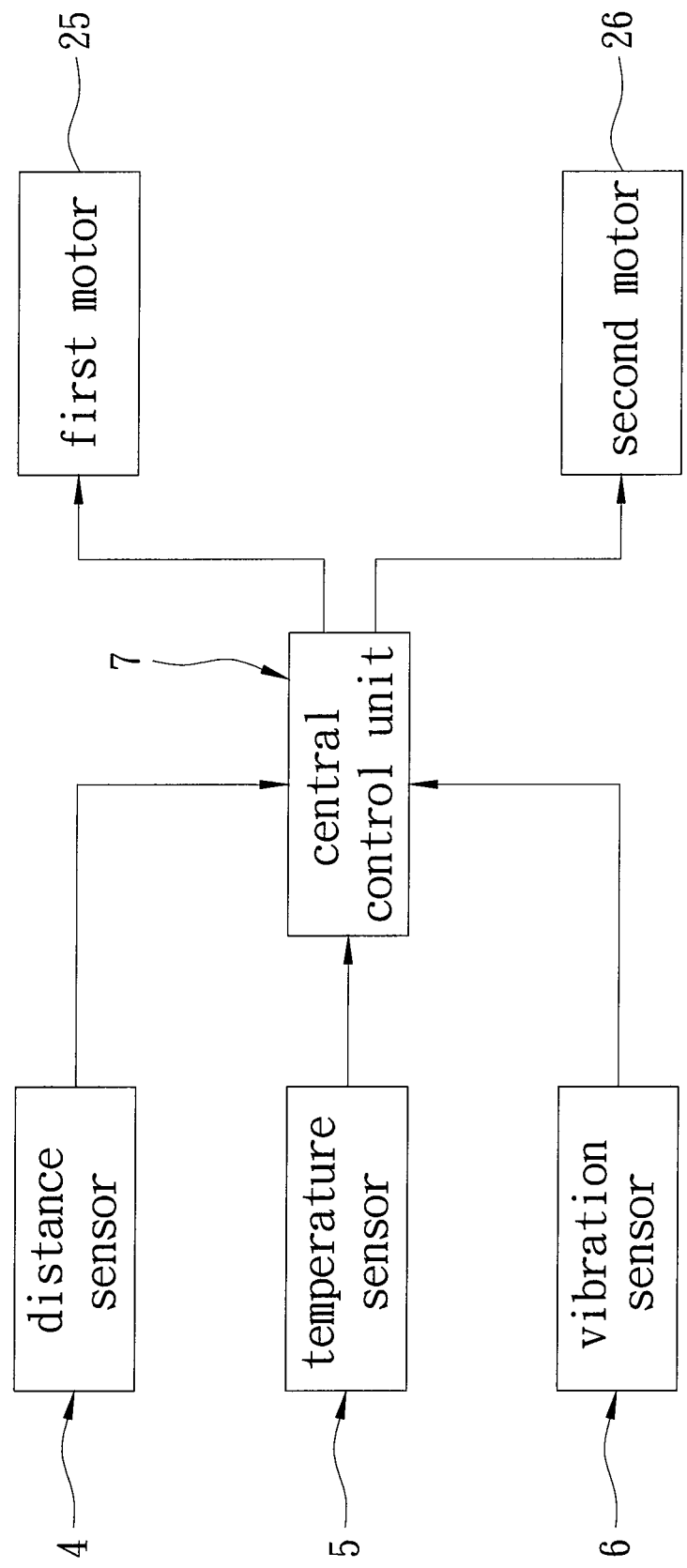
FIG. 4 is a system block diagram of the preferred embodiment.

As shown in FIG. 2, the preferred embodiment of a spindle control system for a milling machine 2 according to the present invention is adapted to be mounted on a milling machine 2. The milling machine 2 has a column 21, an overarm 22 connected to and movable along a Z-axis relative to the column 21, a spindle 24 extending rotatably through the overarm 22 and mounted with a cutter 23, a first motor 25 mounted on the column 21 for driving movement of the overarm 22, and a second motor 26 mounted on the overarm 22 for driving rotation of the spindle 24. The overarm 22 has a sleeve tube 221 extended along the Z-axis for the spindle 24 to be mounted in and to extend through. The spindle 24 has an end portion 241 exposed outside the sleeve tube 221 and mounted with the cutter 23. Referring further to FIGS. 3 and 4, the spindle control system comprises: a ring piece 3, a distance sensor 4, a temperature sensor 5, and a central control unit 7. The spindle control system may further comprise a vibration sensor 6.

The ring piece 3 is sleeved on an outer side of the spindle 24. accordingly, the ring piece 3 may surround an outer side of the spindle 24. In this embodiment, the ring piece 3 is made of metal. In other embodiments, the ring piece 3 may not surround an outer side of the spindle 24, and the ring piece 3 may be a plate, a protrusion, or an integral part of the spindle 24.

The distance sensor 4 is mounted in the sleeve tube 221 of the overarm 22, and is disposed proximate to the end portion 241 of the spindle 24. The distance sensor 4 confronts and is spaced apart from the ring piece 3 for sensing displacement along a first axis by the spindle 24 as a basis for determining spindle deformation. In this embodiment, the distance sensor 4 is a non-contact type of Eddy current displacement meter. In operation, magnetic force lines of the distance sensor 4 and the object to be detected, such as the ring piece 3, may generate Eddy currents. Displacement of the ring piece 3 relative to the distance sensor 4 may have a linear relationship with an output voltage of the distance sensor 4.

The temperature sensor 5 is mounted in the sleeve tube 221 of the overarm 22, and is disposed proximate to the end portion 241 of the spindle 24 and to the cutter 23 for sensing the temperature of the overarm 22 as a basis for determining cutter deformation.

The vibration sensor 6 is an accelerometer mounted on the overarm 22 and coupled electrically to the central control unit 7 for detecting a vibration of the spindle 24.

The central control unit 7 is coupled electrically to the distance sensor 4, the temperature sensor 5, and the vibration sensor 6. The central control unit 7 may be coupled electrically to the first motor 25 and the second motor 26. The central control unit 7 may be configured for determining a compensation parameter (D) based on the displacement sensed by the distance sensor 4 and/or the temperature sensed by the temperature sensor 5, and a heat error model database that includes error data such as reference displacements and a plurality of corresponding reference temperatures. The error data may also include material characteristics, length, width and size of the spindle 24, etc. that may correspond to the reference displacements.

The central control unit 7 is configured to control movement of the overarm 22 by the first motor 25 through a compensation distance based on the compensation parameter (D) to compensate for at least one of the cutter deformation and the spindle deformation. The central control unit 7 may move the overarm 22 along the Z axis in a direction opposed to at least one of the cutter deformation and the spindle deformation.

During operation of the milling machine 2, the spindle 24 may generate a deformation along a first direction (Z1) as the result of a temperature increase. The distance sensor 4 senses displacement of the spindle 24 along the first direction (Z1) by detecting the variation of the Eddy currents generated by the ring piece 3 and the distance sensor 4. The displacement detected by the distance sensor 4 is transmitted to the central control unit 7 to be used as a base for determining a deformation amount of the spindle 24.

The temperature sensor 5 senses the temperature of the cutter 23 by detecting heat transmitted to the overarm 22 through the spindle 24, and communicates the sensed temperature to the central control unit 7. Because the temperature sensor 5 is disposed proximate to the cutter 23, the central control unit 7 may reliably use the temperature as a basis for determining the deformation of the cutter 23.

When the sensed displacement or the sensed temperature exceed a displacement threshold or a temperature threshold, the central control unit 7 determines a compensation parameter (D) using heat error data of the heat error model database and at least one of the sensed displacement and the sensed temperature. The central control unit 7 then controls the first motor 25 to move the overarm 22 by a compensation distance along a second direction (Z2) opposite to the first direction (Z1) to compensate for deformation.

Moreover, while the spindle 24 rotates, the vibration sensor 6 detects vibration of the spindle 24. When the detected vibration is larger than a vibration threshold, the central control unit 7 controls the second motor 26 to decrease the rotation speed of the spindle 24 to decrease the vibration amplitude. The central control unit 7 may also decrease the spindle rotation speed to reduce the temperature of the cutter 23.

The spindle control system for a milling machine according to this invention may have the following advantages, among others:

1) because the distance sensor 4 and the temperature sensor 5 are mounted on the overarm 22 proximate to the end portion 241 of the spindle 24, the accuracy of the detected cutter temperature is improved along with compensation for deformation based on deformation of the cutter 23; and 2) because the spindle control system of this invention uses at least one of sensed displacement and sensed temperature to determine deformation, displacement compensation and manufacturing precision are improved.

While the present invention has been described in connection with what is considered the most practical and preferred embodiment, it is understood that this invention is not limited to the disclosed embodiment but is intended to cover various arrangements included within the spirit and scope of the broadest interpretation to encompass all such modifications and equivalent arrangements.

What is claimed is:

1. A spindle control system for a milling machine, the milling machine including a column, an overarm connected to and movable relative to the column, a spindle extending rotatably through the overarm and having an end portion exposed outside the overarm for mounting a cutter, a first motor mounted on the column for driving movement of the overarm, and a second motor mounted on the overarm for driving rotation of the spindle, said spindle control system comprising:

a distance sensor to be mounted on the overarm and to be disposed proximate to the end portion of the spindle for sensing displacement along a first axis by the spindle as a basis for determining spindle deformation;

a temperature sensor to be mounted on the overarm and to be disposed proximate to the end portion of the spindle for sensing the temperature of the overarm as a basis for determining cutter deformation; and a central control unit coupled electrically to said distance sensor and said temperature sensor, and to be coupled electrically to the first motor and the second motor, said central control unit being configured for determining a compensation parameter based on the displacement sensed by said distance sensor and the temperature sensed by said temperature sensor, and for controlling movement of the overarm by the first motor through a compensation distance based on the compensation parameter to compensate for at least one of the cutter deformation and the spindle deformation.

2. The spindle control system for a milling machine as claimed in claim 1, wherein said central control unit is configured to control the first motor to move the overarm along the first axis in a direction opposed to at least one of the cutter deformation and the spindle deformation.

3. The spindle control system for a milling machine as claimed in claim 1, further comprising a ring piece to surround an outer side of the spindle and confronting said distance sensor, determination of the spindle deformation being based on a distance between said distance sensor and said ring piece.

4. The spindle control system for a milling machine as claimed in claim 3, wherein said distance sensor is a non-contact type displacement meter that detects an eddy current of said ring piece and said distance sensor.

5. The spindle control system for a milling machine as claimed in claim 1, wherein the determination of the compensation parameter by said central control unit is based on the temperature sensed by the temperature sensor and temperature error data, said temperature error data including a plurality of reference displacements and a plurality of corresponding reference temperatures.

6. The spindle control system for a milling machine as claimed in claim 1, further comprising a vibration sensor to be mounted on the overarm and coupled electrically to said central control unit for detecting a vibration of the spindle, wherein said central control unit is further configured to control the second motor to decrease a rotation speed of the spindle when the detected vibration is larger than a vibration threshold.

7. The spindle control system for a milling machine as claimed in claim 6, wherein said vibration sensor includes an accelerometer.

8. A milling machine, comprising:
a column;
an overarm connected to and movable relative to said column;
a spindle extending rotatably through said overarm and having an end portion exposed outside of said overarm for mounting a cutter;
a first motor mounted on said column for driving movement of said overarm;
a second motor mounted on said overarm for driving rotation of said spindle;
a distance sensor mounted on said overarm and disposed proximate to said end portion of said spindle for sensing displacement along a first axis by said spindle as a basis for determining spindle deformation;
a temperature sensor mounted on said overarm and disposed proximate to said end portion of said spindle for sensing the temperature of said overarm as a basis for determining cutter deformation; and
a central control unit coupled electrically to said distance sensor and said temperature sensor, and coupled electrically to said first motor and said second motor, said central control unit being configured for determining a compensation parameter based on the displacement sensed by said distance sensor and the temperature sensed by said temperature sensor, and for controlling movement of said overarm by said first motor through a compensation distance based on the compensation parameter to compensate for at least one of the cutter deformation and the spindle deformation.

9. The milling machine as claimed in claim 8, wherein said central control unit is configured to control said first motor to move said overarm along said first axis in a direction opposed to at least one of the cutter deformation and the spindle deformation.

10. The milling machine as claimed in claim 8, further comprising a ring piece that surrounds an outer side of said spindle and confronts said distance sensor, determination of said spindle deformation being based on a distance between said distance sensor and said ring piece.

11. The milling machine as claimed in claim 10, wherein said distance sensor is a non-contact type displacement meter that detects an eddy current of said ring piece and said distance sensor.

12. The milling machine as claimed in claim 8, wherein the determination of the compensation parameter by said central control unit is based on the temperature sensed by said temperature sensor and temperature error data, said temperature error data including a plurality of reference displacements and a plurality of corresponding reference temperatures.

13. The milling machine as claimed in claim 8, further comprising a vibration sensor mounted on said overarm and coupled electrically to said central control unit for detecting a vibration of said spindle,
wherein said central control unit is further configured to control said second motor to decrease a rotation speed of said spindle when the detected vibration is larger than a vibration threshold.

14. The milling machine as claimed in claim 13, wherein said vibration sensor includes an accelerometer.

* * * * *